UNITED STATES PATENT OFFICE.

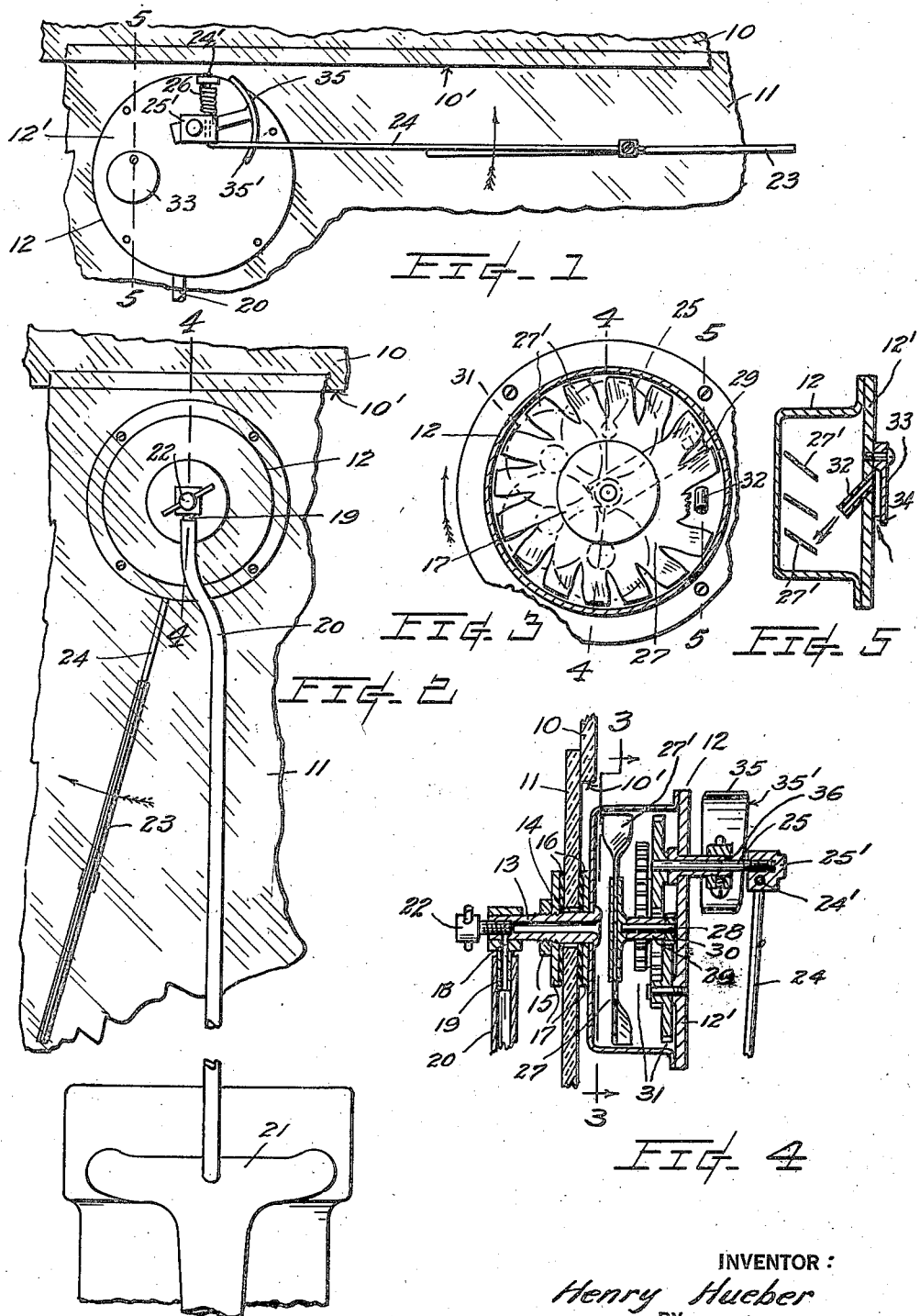

HENRY HUEBER, OF SEATTLE, WASHINGTON, ASSIGNOR TO THOMAS B. POLK, OF SEATTLE, WASHINGTON.

WINDOW-CLEANING DEVICE.

1,404,772.  Specification of Letters Patent.  Patented Jan. 31, 1922.

Application filed November 18, 1920. Serial No. 424,996.

*To all whom it may concern:*

Be it known that I, HENRY HUEBER, a citizen of the United States, residing at Seattle, in the county of King and State of Washington, have invented certain new and useful Improvements in Window-Cleaning Devices, of which the following is a specification.

This invention relates generally to window cleaners and is designed, more particularly, for use in removing moisture, snow, dirt, etc., from the windshields of automobiles.

The object of my improvements is to provide a durable, inexpensively constructed and peculiarly efficient device of this character which is actuated by power under the control of the driver.

The invention consists in the novel construction, adaptation and combination of parts as will be hereinafter described and claimed.

In the accompanying drawings, Figure 1 is a front elevational view of a portion of an automobile windshield with my improved window cleaning device applied thereto. Fig. 2 is a rear elevational view of the same, and including motor connection with the power source. Fig. 3 is a transverse vertical sectional view through the motor member of the device, said section being taken on broken line 3—3 of Fig. 4. Fig. 4 is a detail sectional view through 4—4 of Figs. 2 and 3. Fig. 5 is a detail sectional view through 5—5 of Figs. 1 and 3.

In said drawings, the reference numerals 10 and 11 designate, respectively, the upper and lower panes of an automobile windshield, the upper pane being shown as extending down for a distance below the upper edge of the lower pane.

12 represents a cylindrical casing disposed in front of the windshield pane 11 and having a tubular stem element 13 which extends through an aperture 14 provided in the pane 11. The stem 13 is exteriorly screw-threaded to receive a nut 15 whereby the casing is secured to the windshield. Cushion pieces 16 of felt, or an equivalent, are desirably employed to bear against the glass and are held in place by means of washers 17 as shown in Fig. 4.

The casing stem 13 is provided with a branch outlet 18 extending through a nipple 19 by which one end of a tube 20 is connected to said stem.

The other end of the tube is connected to the intake manifold 21 (Fig. 2) of an automobile engine. 22 represents a valve by means of which the operator may regulate the amount of suction acting through the stem. 23 represents a squeegee which is connected at about its midlength to the arm 24 of a shaft 25 which extends forwardly from the casing 12.

The arm 24 is connected to said shaft for revolving the squeegee in unison therewith but is adapted to swing outwardly by having a bent portion $24^1$ extending pivotally through a hole provided in a head $25^1$ which is rigid with the shaft.

A spiral torsional spring 26 provided upon the arm part $24^1$ tends to yieldingly retain the squeegee against the windshield.

Within the casing 12 is provided a turbine wheel 27, hereinafter designated as the "rotor," equipped with peripheral blades $27^1$. Said rotor is secured to an end of a shaft 28 which extends through a journaled support 29 and carries at its other end a spur-pinion 30 which constitutes the driving element of a train of gears. These gears are designated, generally, by 31 in Fig. 4 and are shown diagrammatically by dot-and-dash lines in Fig. 3, the arrangement and proportions of the gears are such as transmit rotary motion to the shaft 25 at a speed considerably less than that of the rotor.

Extending through the front wall $12^1$ of the casing is a small pipe or nozzle 32 for delivering air against the blades of the rotor to effect the rotation of the latter when a partial vacuum occurs within the casing.

To obviate the admission of water or dirt with the air into the casing, said nozzle is shielded in front of the casing by means of a guard 33 having an air inlet opening 34 at its underside, as shown in Fig. 5.

Included in the invention is a cam plate 35 which is preferably secured to a sleeve 36 which serves as the bearing for shaft 25. The plate 35 is of an arcuate shape and is arranged concentric to shaft 25 and having its forward edge $35^1$ arranged helically with regard to the shaft and functioning as a cam with respect to the arm 24 whereby the squeegee is warded forwardly in opposition to the spring 26 for the purpose of guiding the squeegee to pass unobstructedly by the lower edge 10¹ of the upper windshield pane 10.

The operation of the invention may be explained as follows:

By suitably manipulating the valve 22 the opening of the casing stem 13 is regulated to enable the vacuum obtaining in the manifold 21 to suck air from the casing at the rear of the rotor 27. When this occurs, air at atmospheric pressure enters the casing through the nozzle 32 to impinge upon the rotor blades from the front. The air thus acting against the rotor serves to effect the rotation of the rotor which, acting through the train of gears 31, imparts revoluble motion to the arm 24 and the squeegee 23 carried thereby.

According to the present invention the revolving or orbital course of the squeegee produces a clean annular surface upon the windshield.

By adjusting the valve 22 the squeegee may be made to travel fast or slow selectively as may be desirable or requisite.

The cam device 35 is an important feature of the invention as it guides the squeegee in its travel between the planes of the upper and lower panes of a windshield where the upper one is offset as in the illustrated example.

What I claim, is,—

1. A window cleaner comprising a shaft, an arm connected at one of its ends to said shaft, a squeegee connected to the other end of said arm, a motor for rotating said shaft to effect the revolution of the squeegee entirely around the motor, and cam means engageable by said arm to raise the squeegee from the glass in each revolution of the same.

2. A window cleaner comprising a squeegee, a shaft, an arm pivotally connected at its opposite ends to said squeegee and shaft, means for rotating the shaft to revolve said squeegee, means for yieldingly retaining said squeegee in contact with the glass, and cam means in the path of said arm to temporarily withdraw the squeegee from contact with the glass in each revolution of the squeegee.

Signed at Seattle, Washington, this 5th day of November, 1920.

HENRY HUEBER.

Witnesses:
PIERRE BARNES,
MARGARET G. TUPPLE.